United States Patent [19]

Ogawa

[11] 3,854,121

[45] Dec. 10, 1974

[54] APPARATUS FOR FIXING THE LEVELS OF OUTPUTS FROM A DATA STORING CIRCUIT

[75] Inventor: Hisaharu Ogawa, Yokohama, Japan

[73] Assignee: Tokyo Shibaura Electric Co., Ltd., Saiwai-ku, Kawasaki-shi, Japan

[22] Filed: Feb. 22, 1973

[21] Appl. No.: 334,571

[30] Foreign Application Priority Data

Feb. 29, 1972 Japan .............................. 47-20214

[52] U.S. Cl. .............................. 340/168 R, 340/172

[51] Int. Cl. .............................................. H04q 1/00

[58] Field of Search .................... 328/172 R, 173 R; 340/168 R, 172; 235/153 AC; 324/73 R

[56] References Cited

UNITED STATES PATENTS

| | | | |
|---|---|---|---|
| 2,928,073 | 3/1960 | Greanias | 328/173 X |
| 3,174,054 | 3/1965 | Wortzman | 328/172 X |
| 3,309,615 | 3/1967 | Baldwin | 328/173 X |
| 3,370,181 | 2/1968 | Sitomer | 328/172 X |

*Primary Examiner*—Harold I. Pitts
*Attorney, Agent, or Firm*—Flynn & Frishauf

[57] ABSTRACT

Apparatus for fixing the levels of the outputs of a circuit having a memory function comprises a signal generator for supplying input signals to the circuit having a memory function through an input gate circuit which is controlled by a control signal so as to selectively permit or prevent supply of the input signals to the memory function circuit. Means is provided for selecting predetermined level states from the outputs of the memory function circuit, and further means is provided for generating the control signal and supplying the control signal to the input gate circuit when the predetermined level states of the outputs of the memory function circuit have been produced, to thereby prevent further supply of input signals to the memory function circuit and fix the output level states of the memory function circuit.

10 Claims, 5 Drawing Figures

APPARATUS FOR FIXING THE LEVELS OF OUTPUTS FROM A DATA STORING CIRCUIT

This invention relates to an apparatus for fixing the levels of outputs from a circuit having memory function, which outputs vary according to the manner in which input signals are received.

Where examination is made of the performance of a circuit having a memory function, for example, a logical circuit, it is necessary to determine whether said logical circuit gives forth an output at the desired level upon receipt of a prescribed input signal. To this end, the input side of said logical circuit should be supplied with input signals in the preset pattern on time sequence. To obtain such input signals, it is required to use and carry out proper programming, for example by using, a word generator. However, an apparatus to attain this object would unavoidably be complicated and bulky, resulting in a tremendous cost. Particularly, where a test is made on the function of a circuit having numerous input and output terminals and an intricate circuit arrangement, such as a large scale integrated circuit (abbreviated as "LSI"), a variety of testing devices is required depending upon the type of LSI being tested.

It is accordingly the object of this invention to provide an apparatus for fixing outputs from a circuit having a memory function to the selected levels without supplying a programmed input signal.

SUMMARY OF THE INVENTION

Apparatus according to this invention for fixing the levels of outputs from a circuit comprises a circuit having a memory function, outputs from which having their levels which vary according to the manner in which input signals are received; a signal generator for supplying said input signals to said circuit having a memory function; an input gate circuit controlled by a separately generated control signal, so as to permit or prevent any further supply of said input signals to said circuit having a memory function; a first means for selecting a desired level state from output level states of said circuit having a memory function; and a second means for generating said control signal when said desired level state has been produced, thereby preventing any further supply of said input signals to said circuit having a memory function to fix the desired level state.

The above-mentioned circuit having a memory function may be a unit subjected to examination, a unit for supplying an output having a fixed level to another external circuit, a memory circuit itself or a combination of a memory circuit and a non memory circuit.

DETAILED DESCRIPTION OF ILLUSTRATED EMBODIMENTS

Figure 1:
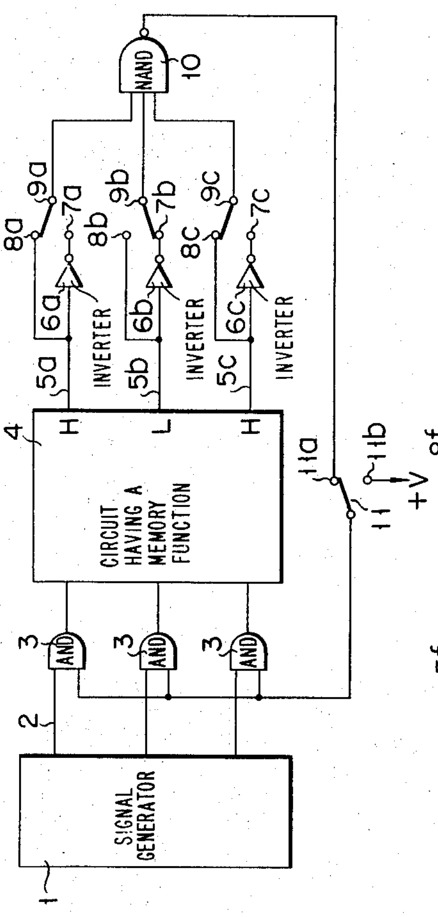
FIG. 1 is a block circuit diagram of an output level-fixing apparatus according to an embodiment of this invention.

Referring to FIG. 1, an output signal 2 from a signal generator 1 is supplied to the input gate circuits of three AND circuits 3, outputs from which in turn are conducted to a circuit 4 having a memory function, for example, a unit being examined. Outputs 5*a*, 5*b* and 5*c* from said circuit having a memory function 4 have their levels varied according to the manner in which input signals from said signal generator 1 are received. FIG. 1 illustrates the outputs whose levels have been selectively fixed to H, L and H respectively. To the output terminals 8*a*, 8*b* and 8*c* are connected inverters 6*a*, 6*b* and 6*c* respectively. The outputs of said inverters are coupled to the output terminals 7*a*, 7*b* and 7*c* respectively. There are further provided switches 9*a*, 9*b* and 9*c* having connections which are switchable between the respective groups of terminals as 7*a* – 8*a*, 7*b* – 8*b* and 7*c* – 8*c*. The switches 9*a*, 9*b* and 9*c* are connected to the input side of a NAND circuit or judging gate circuit 10. There is further provided a switch 11 switchable between terminals 11*a* and 11*b*, said switch 11 being connected in common to the input terminals of the aforesaid three AND circuits 3. The terminal 11*a* is connected to the output terminal of said NAND circuit 10 and the terminal 11*b* to a positive power source (not shown).

This invention enables an output level-fixing apparatus of the above-mentioned arrangement to be operated not only by positive, but also by negative logic. The signal generator 1 may be a type generating $2^n$ code signals or random pulses or a combination of said $2^n$ code signals and random pulses. Where the outputs 5*a*, 5*b* and 5*c* from the circuit 4 are fixed to H (high level), L(low level) and H (high level) respectively, then the switches 9*a*, 9*b* and 9*c* are switch so as to be connected to the terminals 8*a*, 7*b* and 8*c* respectively. When, under this condition, connection of the switch 11 is changed over from the terminal 11*a* to the terminal 11*b*, then the three AND gates 3 are opened to allow signals to be conducted from the signal generator 1 to the circuit 4. When said circuit 4 is brought to a normal operating condition after a certain length of time, then connection of the switch 11 is changed over to the terminal 11*a*. The moment the outputs 5*a*, 5*b* and 5*c* have the levels of H, L and H respectively, outputs from the switches 9*a*, 9*b* and 9*c* all attain the level of H. When supplied with said outputs of the same level H, the NAND gate circuit 10 generates an output having the level L, preventing further input signals 2 from the pulse generator 1 from being supplied to the circuit 4. Since, however, said circuit 4 having a memory function continues to maintain the previous state due to its memory action, outputs 5*a*, 5*b* and 5*c* from said circuit 4 will be fixed to the prescribed levels H, L and H respectively. Therefore, the performance of said circuit 4 can be evaluated by examining whether the outputs 5*a*, 5*b* and 5*c* from said circuit 4 are kept at the prescribed levels H, L and H respectively.

In the foregoing embodiment, the three input gate circuits 3 are AND gate circuits and the judging gate circuit 10 is a NAND gate circuit. Where the input gate circuit is of the AND or NAND type, then the judging gate circuit may be of either the NAND or OR type. Further, where the input gate circuit is of the OR or NOR type, said judging gate circuit may be of either the NOR or AND type. Where, however, said judging gate circuit is of the OR or NOR type, then connection of the switches 9*a*, 9*b* and 9*c* should be switched over in the opposite direction to that shown in FIG. 1.

The foregoing description clearly shows that the signal generator 1 may be of a simple type as previously mentioned. Further, since the output level-fixing apparatus of this invention includes not only the abovementioned signal generator 1 of simple construction but also means for fixing output levels from a circuit having a memory function such as an LSI circuit to a selected level state, it will be easily understood that the same type of tester can be effectively used in examining various kinds of LSI circuits. It should be understood that in some embodiments switching means 9 may be omitted.

Figure 2A:
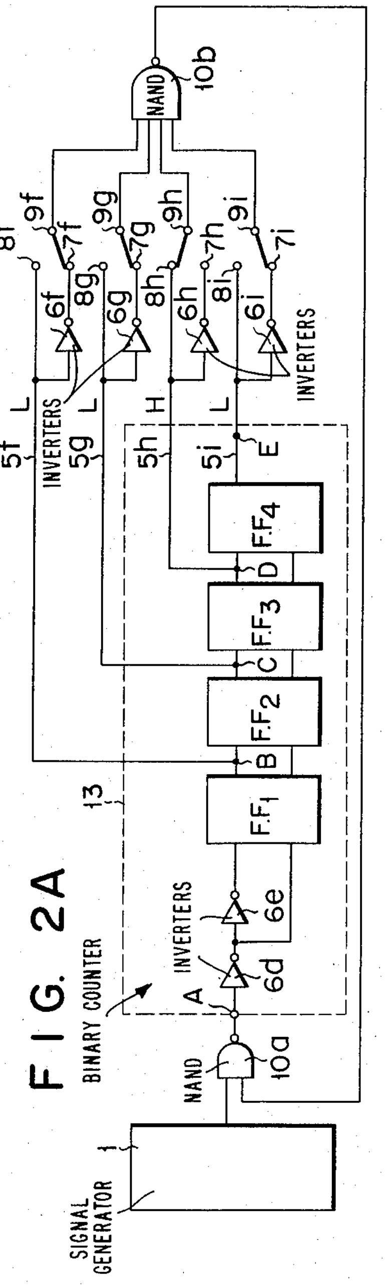
FIG. 2A is a block circuit diagram of an output level-fixing apparatus according to another embodiment of the invention which is designed to fix the levels of outputs from the respective stages of a counter circuit at a given point of time.

FIG. 2A illustrates the arrangement of an apparatus according to another embodiment of this invention for fixing the levels of outputs from a binary counter circuit 13. This circuit 13 comprises JK flip-flop circuits $F.F_1$ to $F.F_4$ triggered at the decaying portion of an input pulse. An output signal from a signal generator 1 is supplied to flip-flop circuit $F.F_1$ through a NAND gate circuit 10*a* (which is preferred where triggering is carried out at the decaying portion of an input pulse) and inverters 6*d* and 6*e*. Outputs 5*f* to 5*i* from points B, C, D and E are conducted to terminals 8*f* to 8*i* and also to the inverters 6*f* to 6*i*. Outputs from the inverters 6*f* to 6*i* are supplied to terminals 7*f* to 7*i*, and outputs from switches 9*f* to 9*i* are coupled to a NAND gate circuit 10*b*. An output from said NAND gate circuit 10*b* is fed as a control signal back to the NAND gate circuit 10*a*. FIG. 2A indicates the condition where the outputs 5*f* to 5*i* have their levels fixed to L, L, H and L respectively. In this case, the switches 9*f* to 9*i* are set as indicated in FIG. 2A.

Figure 2B:
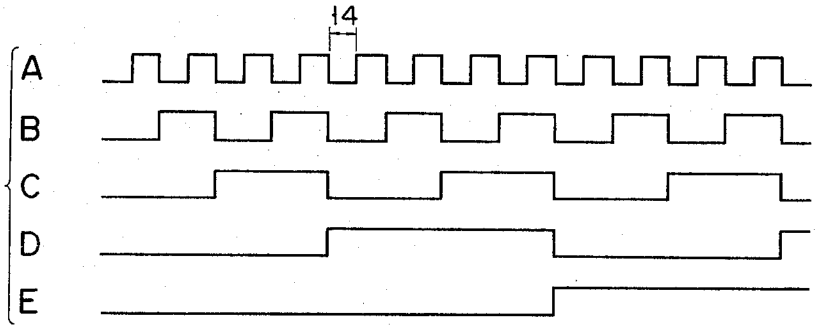
FIG. 2B illustrates the wave forms of signals produced at the respective stages of FIG. 2A.

FIG. 2B shows the wave forms of signals produced at the points A, to E, and represents the case where the performance of the binary counter circuit 13 is evaluated by fixing the levels of outputs obtained at the points B to E to L, L, H and L respectively. To fix the outputs 5*f*, 5*g*, 5*h* and 5*i* to the levels L, L, H and L respectively, it is only required to connect the switches 9*f* to 9*i* as indicated in FIG. 2A. While the output levels L, L H and L are not attained, an output from the NAND gate circuit 10*b* remains at the level H, allowing an output signal from the signal generator 1 to pass through the NAND gate circuit 10*a*. However, where the outputs 5*f* to 5*i* have levels as described above, an output from the NAND gate circuit 10*b* has its level changed to L, preventing an output signal from the generator 1 from being conducted through the NAND gate circuit 10*a* to the binary counter circuit 13. As a result, the outputs 5*f*, 5*g*, 5*h* and 5*i* have their levels respectively fixed to L, L, H and L as prescribed. Where an output from the NAND gate circuit or judging gate circuit 10*b* has the level L, then the binary counter circuit 13 is proved to have a good performance. Conversely, where an output from said judging gate circuit 10*b* is still kept at the level H, then said binary counter circuit 13 can be evaluated as deflective.

Figure 3:
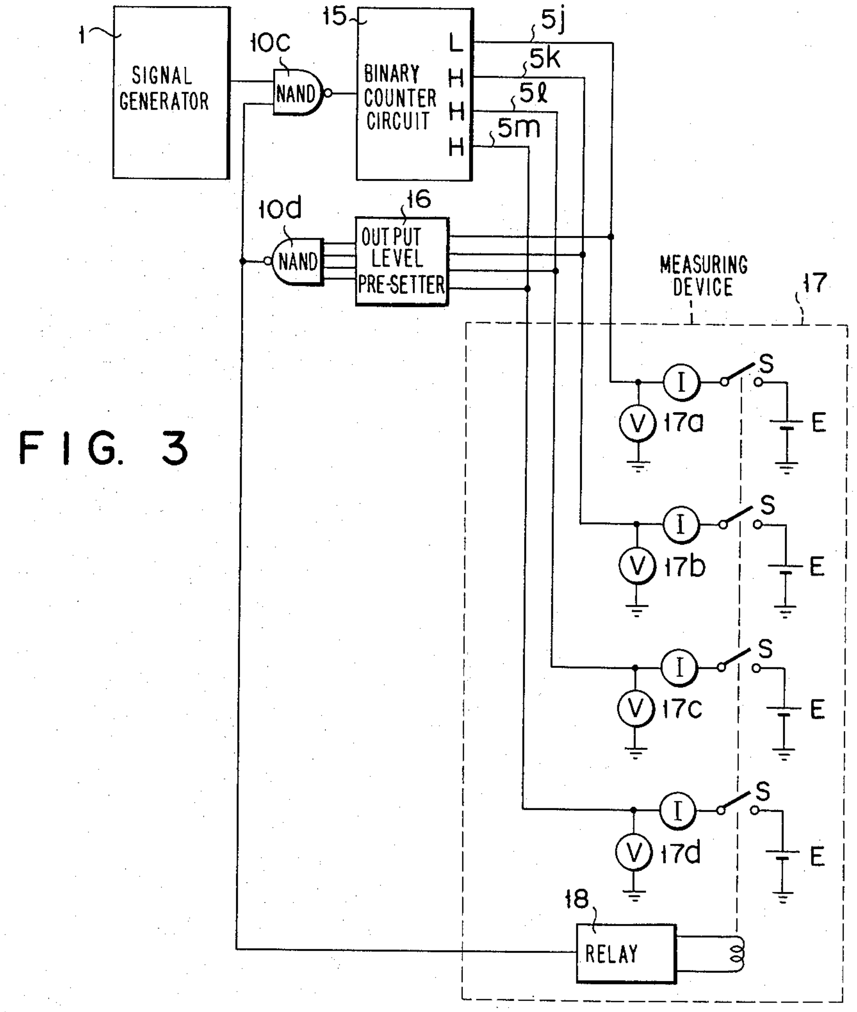
FIG. 3 is a block circuit diagram of an output level-fixing apparatus according to still another embodiment of the invention which includes a circuit for measuring the current or voltage of an output whose level has been fixed.

FIG. 3 illustrates another embodiment of this invention, wherein outputs 5*j*, 5*k*, 5*l* and 5*m* from a binary counter circuit 15 have their levels fixed to L, H, H and H respectively, and there is additionally provided a circuit for detecting said output levels. An output signal from a signal generator 1 is conducted through a NAND gate circuit 10*c* to the binary counter circuit 15. There is provided an output level presetter 16 for previously fixing the levels of outputs 5*j*, 5*k*, 5*l* and 5*m* from said binary counter circuit 15 to L, H, H and H respectively. Outputs from said output level presetter 16 are supplied to a judging NAND gate circuit 10*d*. On the other hand, outputs 5*j* to 5*m* are conducted to a measuring device 17, which comprises voltage-current measuring circuits 17*a* to 17*d* each including an ammeter I connected in series with a power source E through a switch S and a voltmeter V connected between the ground and the respective terminals of the aforesaid outputs 5*j* to 5*m*; and a common relay 18 for simultaneously operating the respective switches S. On the other hand, an output from the judging NAND gate circuit 10*d* is supplied not only to the input NAND gate circuit 10*c*, but also to said common relay 18. The power sources E of the aforesaid voltage-current measuring circuits 17*a* to 17*d* each have a freely adjustable voltage level.

Where the output level presetter 16 is so operated in advance as to cause outputs 5*j*, 5*k*, 5*l* and 5*m* from the binary counter circuit 15 to have their levels fixed to the indicated L, H, H and H, then an output from the judging NAND gate circuit 10*d* prevents any further supply of a signal from the signal generator 1 to said binary counter circuit 15, thereby permanently fixing the outputs 5*j* to 5*m* to the above-mentioned levels L, H, H and H immediately upon their generation. At this time, the common relay 18 is actuated to close the switches S of the voltage-current measuring circuits 17*a* to 17*d*, thereby enabling the measurement of the current of said outputs 5*j* to 5*m*. Where the voltage of said outputs 5*j* to 5*m* is measured, the common relay 18 is rendered inoperative to open said switches S. For elevation of the accuracy of measurement, it is preferred to use a judging gate circuit of high impedance. Where it is desired to have the outputs 5*j* to 5*m* from the binary counter circuit 15 fixed to different levels from the aforesaid L, H, H, and H, then the output level presetter 16 is automatically operated again in advance. In this case, too, the current and voltage of outputs bearing said different levels can be quickly evaluated by the aforesaid measuring circuits 17*a* to 17*d*.

Figure 4:
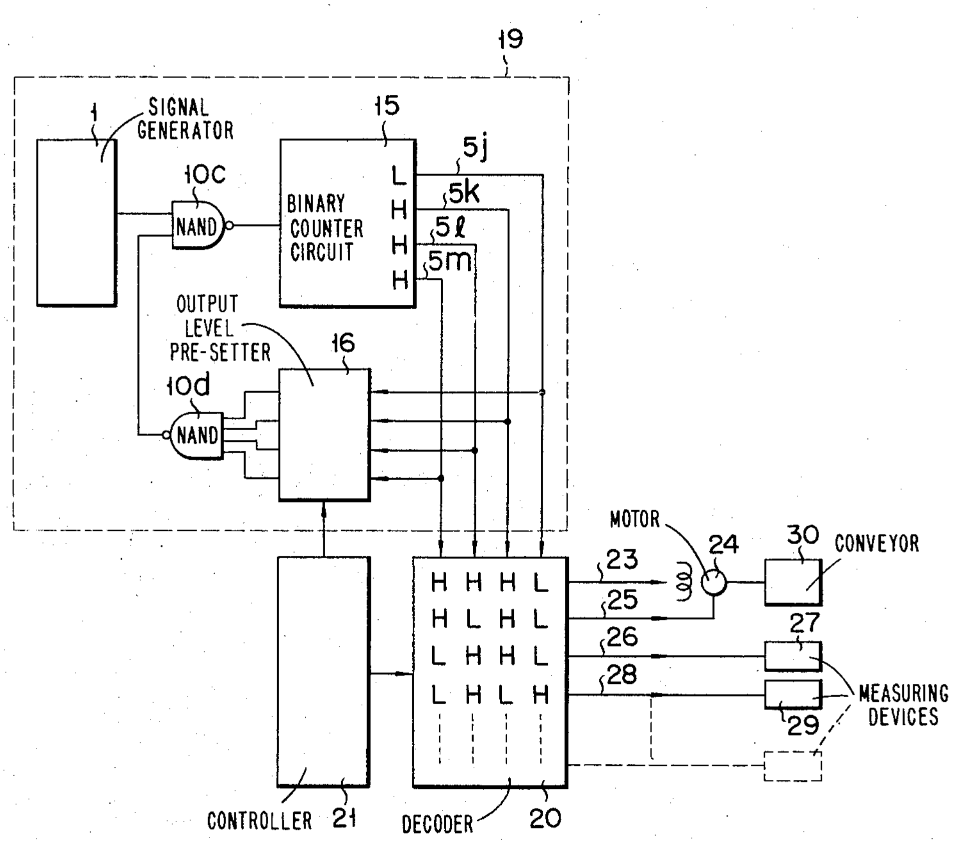
FIG. 4 is a block circuit diagram of an output level-fixing apparatus according to a further embodiment of the invention which is provided with a decoder for decoding outputs from a circuit having a memory function whose levels have been fixed as prescribed and controlling an external device by the resultant output signal from said decoder.

FIG. 4 is a block circuit diagram of an output level-fixing apparatus according to a further embodiment of this invention wherein there is provided a means for controlling an external device. That section of the output level-fixing apparatus which is surrounded by broken lines 19 is identical with that of FIG. 3, and the parts of said second which are the same as those of FIG. 3 are denoted by the same reference numerals and description thereof is omitted. Outputs 5*j*, 5*k*, 5*l* and 5*m* from the binary counter circuit 15 whose levels have been fixed to L, H, H and H respectively are supplied to a decoder 20. The output level presetter 16 and decoder 20 are controlled by a control means 21. FIG. 4 indicates the condition where said outputs 5*j* to 5*m* have their levels fixed to L, H, H and H respectively. If, in this case, inputs to the decoder 20 have their levels fixed to L, H, H and H, an output 23 from said decoder 20 is so set by the control means 21 in advance as to start a motor 24, and then the resultant output 23 from said decoder 20 will be able to drive a motor 24. And where inputs to the decoder 20 have their levels changed to L(5*j*), H(5*k*), L(5*l*) and H(5*m*), then the resulting output 25 from the decoder 20 will be able to stop the motor 24. Further, where inputs to the decoder 20 have their levels varied to L(5*j*), H(5*k*), H(5*l*) and L(5*m*), then the resultant output 26 from said decoder 20 will actuate an instrument 27 to start a first measurement. Where inputs to the decoder 20 have their levels changed to H(5*j*), L(5*k*), H(5*l*) and L(5*m*), then the resultant output 28 from said decoder 20 will operate another instrument 29 to commence a second measurement. Where desired tests are successively made on an object of examination such as an integrated circuit by shifting it, for example, on a conveyor 30 by rotation of the motor 24, then first and second measurements can be effected in succession by fixing outputs from the binary counter circuit 15 to a proper combination of levels by the control means 21. It is also possible to allow a time interval between the first and second fixations of output level by presetting the presetter 16 by the control means 21. The embodiment of FIG. 4 can fix outputs from the binary counter circuit 15 to sixteen combinations of levels, thus permitting a great variety of controls, examinations and measurements.

What is claimed is:

1. An apparatus for fixing the levels of outputs from a circuit comprising:

a circuit having a memory function, outputs from which have their levels varied according to the manner in which input signals are received;

a signal generator for supplying said input signals to said circuit having a memory function;

an input gate circuit controlled by a separately generated control signal so as to pemit or prevent any further supply of said input signals to said circuit having a memory function;

a first means for selecting a desired level state from output level states of said circuit having a memory function; and a second means for generating said control signal when said desired level state has been produced, thereby preventing any further supply of said input signals to said circuit having a memory function to fix the desired level state.

2. An apparatus according to claim 1 wherein the first means includes a means for converting the levels of all outputs from said circuit having a memory function to the same level; and the second means includes a judging gate circuit for producing said control signal upon receipt of said outputs converted to the same level.

3. An apparatus according to claim 2 wherein the means for converting the levels of all outputs from said circuit having a memory function to the same level includes at least one switch for supplying a signal to said judging gate circuit by having its connection changed over across the input and output terminals of an inverter connected in series with at least one of the output terminals of said circuit having a memory function.

4. An apparatus according to claim 2 wherein the means for converting the levels of all outputs from the circuit having memory function to the same level includes an inverter connected in series with at least one of the output terminals of said circuit having a memory function.

5. An apparatus according to claim 1 wherein said circuit having a memory function is one subjected to examination.

6. An apparatus according to claim 5 wherein said circuit subjected to examination is a counter circuit.

7. An apparatus according to claim 1 wherein said circuit having a memory function includes a circuit not having memory function.

8. An apparatus according to claim 1 which further comprises a switching means controlled by said control signal and operable when outputs from said circuit having a memory function have their levels selectively fixed to said desired level state; and a measuring circuit for measuring said fixed level state.

9. An apparatus according to claim 1 which further comprises a further means for controlling said first means to select said desired level state from output level states of said circuit having a memory function and a decoder for decoding said desired level state selectively fixed by said means, further thereby producing an output for controlling the operation of an external device.

10. An apparatus according to claim 1 wherein the signal generator is a generator of random pulses.

* * * * *

UNITED STATES PATENT OFFICE
CERTIFICATE OF CORRECTION

Patent No. 3,854,121 Dated December 10, 1974

Inventor(s) Hisaharu OGAWA

It is certified that error appears in the above-identified patent and that said Letters Patent are hereby corrected as shown below:

Column 6, line 45, change "said means, further" to --said further means,--.

Signed and sealed this 18th day of February 1975.

(SEAL)
Attest:

RUTH C. MASON
Attesting Officer

C. MARSHALL DANN
Commissioner of Patents and Trademarks